Dec. 19, 1933.  H. S. MARTIN  1,939,822
REGISTERING, DISPLAY, AND TRANSMISSION APPARATUS AND SYSTEM
Filed May 6, 1926  4 Sheets-Sheet 1

INVENTOR.
HARRISON S. MARTIN.
BY
*Stockbridge & Borst*
ATTORNEYS

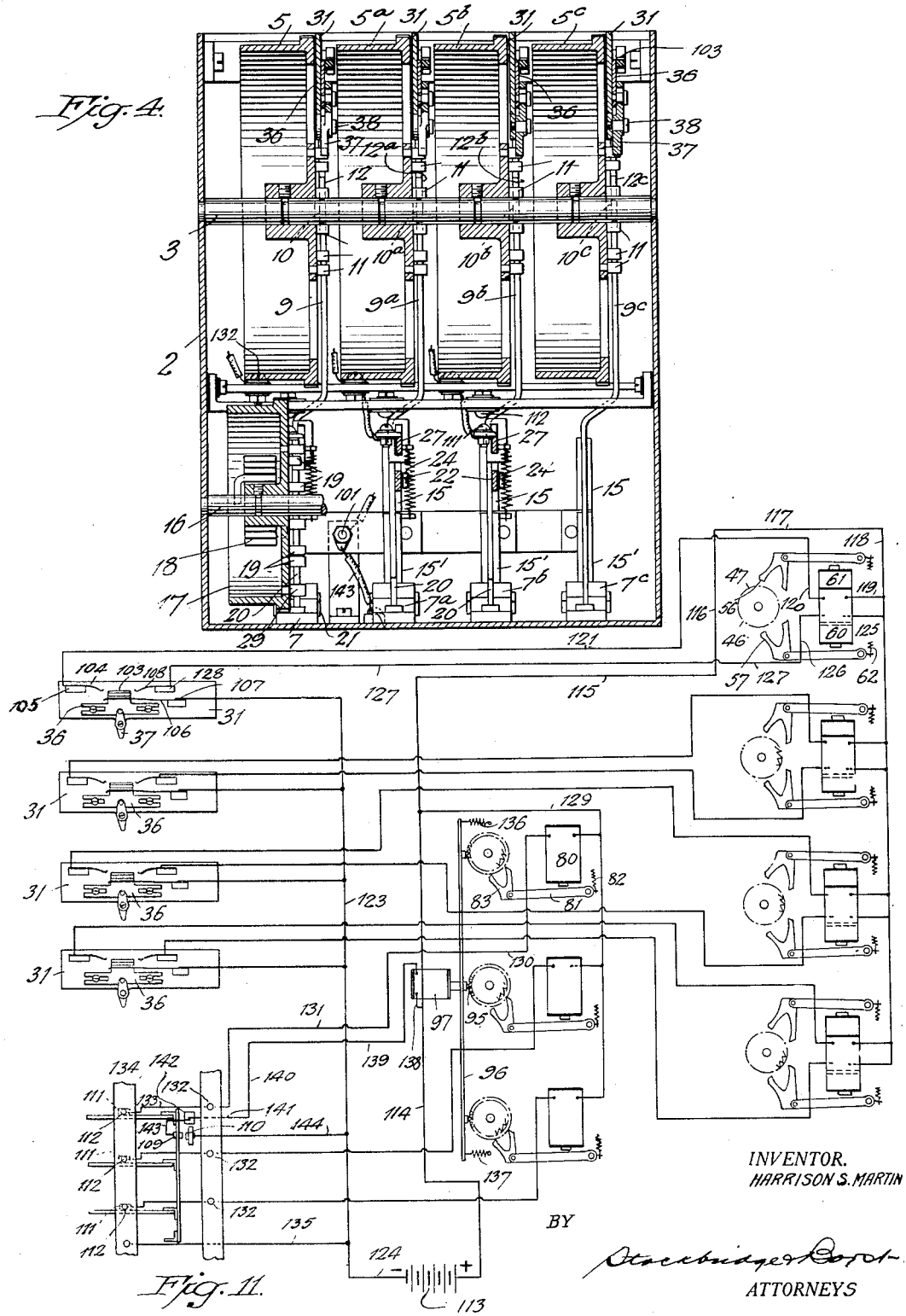

Dec. 19, 1933.                H. S. MARTIN                1,939,822
REGISTERING, DISPLAY, AND TRANSMISSION APPARATUS AND SYSTEM
Filed May 6, 1926        4 Sheets-Sheet 3
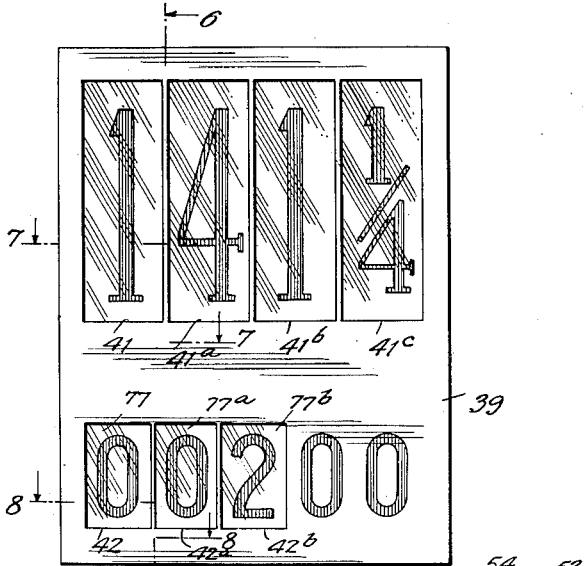
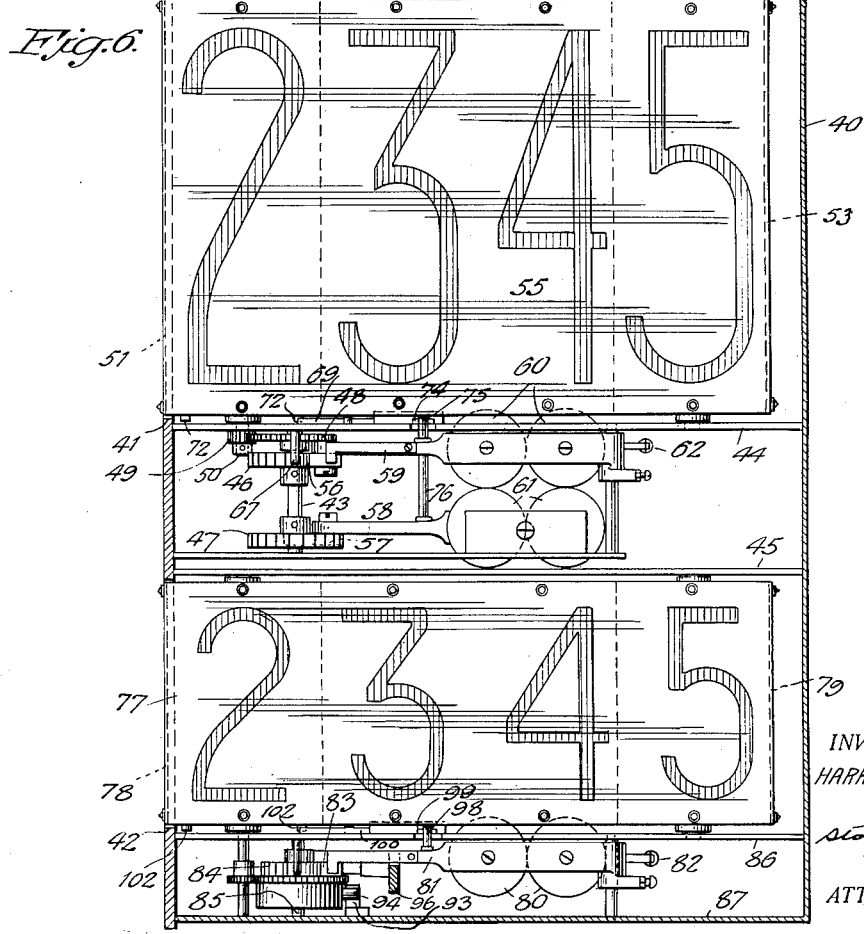
INVENTOR.
HARRISON S. MARTIN
ATTORNEYS

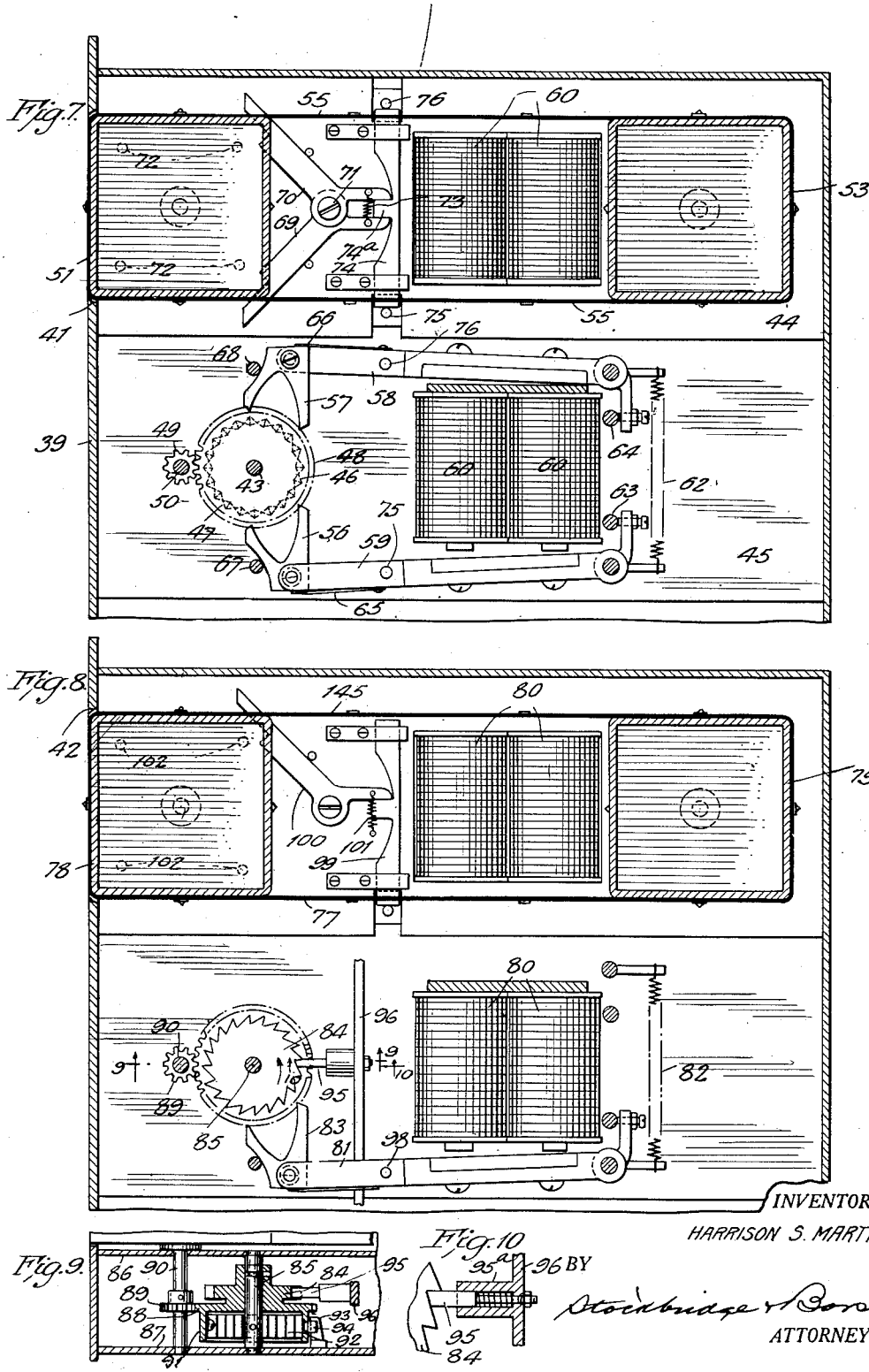

Patented Dec. 19, 1933

1,939,822

UNITED STATES PATENT OFFICE 1,939,822

REGISTERING, DISPLAY, AND TRANSMISSION APPARATUS AND SYSTEM

Harrison S. Martin, Brooklyn, N. Y.

Application May 6, 1926. Serial No. 107,032

3 Claims. (Cl. 177—338)

This invention relates to apparatus and system for registering and displaying information at one point and for simultaneously transmitting, reproducing and displaying such information at one or more distant points. While my invention possesses utility for the registration, display, transmission and reproduction of information generally, I have, in my present application, illustrated and described it as embodied in an apparatus and system for the registration, display and dissemination of market news, such, for example, as the sale prices and volumes of sales involved in transactions occurring upon the floor of a stock exchange or board of trade, where securities or commodities are bought and sold.

Where many different items are handled in large volume on the floor of such an exchange, it is customary, in order to avoid confusion, to restrict dealings in a particular item to the immediate vicinity of a certain trading post or station, about which congregate brokers dealing in such item. Thus, one of these posts may be the trading center for as many as twenty-four items, to each of which a side of the post is allocated. In the case of a large exchange, many such trading posts are installed on the floor. When a transaction in a particular item is effected, the sale price involved is at once manually registered upon a device mounted on the side of the trading post assigned to such item. A memorandum of the sale is forthwith sent by messenger to one of several centrally located operators, each of whom dispatches to the ticker system the information received by him.

This practice is open to a number of serious objections. For instance, one sending apparatus for the ticker system must handle all the details of the entire volume of business transacted on the floor; and where this volume is large, as is frequently the case, the ticker is unable to keep pace with the actual transactions. The average sending capacity of the ticker is sixty quotations per minute, whereas the sales often far exceed this number. As a result, the ticker system sometimes falls half an hour or more behind the actual market transactions, which renders it a very unreliable source of information as to current prices. Under these conditions, brokers must send to the trading post to learn the last sale price and the volume of the sale of an item in which they are interested.

An object of my invention is to overcome these difficulties by causing the registration of the sale of any item at any trading post to be automatically transmitted to one or more central stations, where all this information is reproduced and simultaneously and conspicuously displayed, rather than being displayed item by item on the ticker tape, with the attendant delay as hereinabove described. Confusion is thereby avoided, and a broker or customer has merely to glance at the display board to learn the sale price and volume of the last transaction in a particular security or commodity in which he may be interested.

In the accompanying drawings:—

Fig. 4 is a vertical sectional detail of the same on the line 4—4 of Fig. 2.

Fig. 5 is a front elevation of a receiving and reproducing apparatus also forming a part of my invention and adapted to be actuated by the master device.

Fig. 6 is a vertical sectional detail of the receiving and reproducing apparatus on the line 6—6 of Fig. 5.

Fig. 7 is a transverse sectional detail of the same on the line 7—7 of Fig. 5.

Fig. 8 is another transverse sectional detail of the same on the line 8—8 of Fig. 5.

Fig. 9 is another transverse sectional detail of the same.

Fig. 10 is a fragmentary sectional detail on the line 10—10 of Fig. 8.

Fig. 11 is a schematic diagram of an electrical system which may be employed as a part of my invention.

Like reference characters indicate like parts throughout the drawings.

Figure 1:
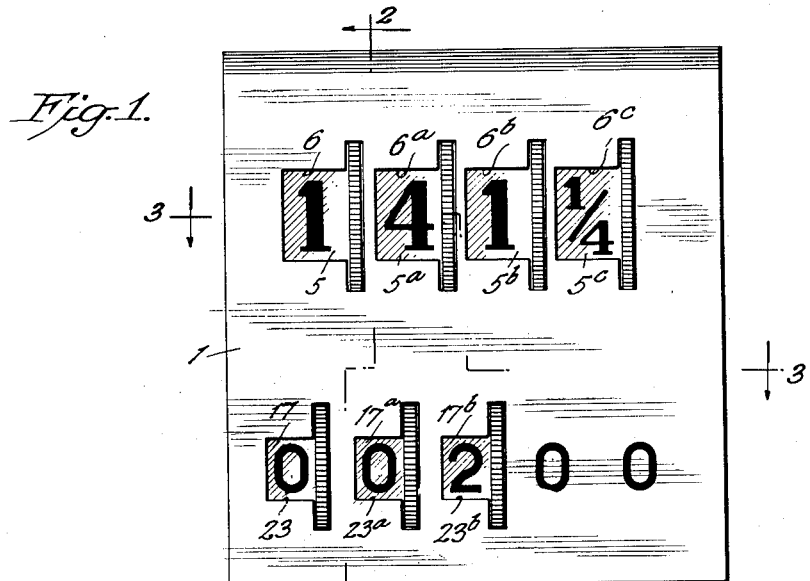
Fig. 1 is a front elevation of a master registering, display and transmitting apparatus forming a part of my invention.

In the illustrated embodiment of the invention, I employ a master registering, display and transmitting apparatus 1, constructed and arranged to register, display and transmit data as to sales of a single item, and to be mounted upon the side of a trading post assigned to that particular security or commodity. This apparatus comprises a housing 2, provided with apertures 6, 6a, 6b and 6c. Rigidly supported in this housing is shaft 3, rotatably mounted upon which are four price registering-and-transmitting wheels, 5, 5a, 5b and 5c. Each of the price registering-and-transmitting wheels 5, 5a and 5b carries on its periphery the ten digits. These three wheels are adapted to be manually rotated by the knurled wheels secured thereto and protruding through the opening in the casing tube in either a clockwise or a counter-clockwise direction to so juxtapose digits of the several wheels that they conjointly register and display, through apertures 6, 6a, and 6b, a desired integer, such as 141 of Fig. 1. Wheel 5c may carry symbols representing fractions, such as ⅛, ¼, ⅜, ½, ⅝, ¾ and ⅞; and its manual rotation in either direction registers and displays, through aperture 6c, the particular fraction which, taken with the integer, represents the price at which a sale has been consummated.

Mounted upon the bottom of housing 2 are brackets 7, 7a, 7b and 7c, carrying pivots such as 8, for levers 9, 9a, 9b and 9c. Each of said levers has a cam portion such as 10, which, by engagement with two adjacent pins of the ten pins such as 11 which are carried by each of the price registering-and-transmitting wheels 5, 5a, 5b and 5c, maintains its said wheel in position to display the desired digit. Integral with the upper end of said levers 9, 9a, 9b and 9c respectively, are arms 12, 12a, 12b and 12c, forked at their ends to embrace shaft 12'. Vertical switch-levers 13, 13a, 13b and 13c are pivotally supported at their upper ends upon shaft 14. Flat springs such as 15 press against vertical switch-levers 13, 13a, 13b and 13c, opposing the action of arms 12, 12a, 12b and 12c. Each of the cams 10, 10a, 10b and 10c of the levers 9, 9a, 9b and 9c is maintained in contact with its coacting pins, such as 11, by a spring such as 15'.

Rigidly supported in housing 2 is a shaft 16, which carries three volume registering-and-transmitting wheels 17, 17a and 17b, manually rotatable on said shaft in a counter-clockwise direction. Each of these volume registering-and-transmitting wheels carries the ten digits, and its manual rotation against the action of a coiled spring such as 18 juxtaposes digits of said wheels respectively to conjointly register and display, through apertures 23, 23a and 23b, the volume of a sale which has been made. Such rotation also subjects the coiled springs to tension and stores energy therein. Each of the three volume registering-and-transmitting wheels is provided with ten pins, such as 19. Coacting with any two adjacent pins to maintain the volume registering-and-transmitting wheel in position is the cam portion of a locking lever, such as 20, pivoted at 21 in bracket 7. Locking lever 20 carries link 22, slidable with reference to stud 24, mounted on lever 9. Link 22 is held in position with reference to switch-lever 13 by stud 26. Coiled spring 25, anchored between studs 24 and 26, maintains the relationship between link 22 and vertical switch lever 13. Horizontal switch-lever 27 is attached by pivot 27' to vertical switch-lever 13. Coiled springs such as 28 normally maintain horizontal switch-lever 27 in contact with one of pins 19, carried by volume registering-and-transmitting wheel 17, which wheel also carries stop pin 29, adapted to contact with stop 30, mounted upon the bottom of housing 2.

Transverse frames such as 31 carry studs 32 and 33, engaging slots in a shuttle such as 36, carrying stud 38, pivotally mounted upon which is trigger 37, normally maintained in a central position by coiled springs 34 and 35. Rotation of price registering-and-transmitting wheel 5 causes pins 11 to engage and disengage the lower end of trigger 37 and to move shuttle 36 to the right or left (Fig. 2), depending upon whether such rotation is in a clockwise or in a counter-clockwise direction. Shuttle 36 is thereby caused to close and open one or other of two electric circuits, in a manner and for a purpose to be hereinafter set forth.

My invention also includes a receiving and reproducing apparatus 39 (Fig. 5), comprising a housing 40 (Fig. 6), provided with apertures 41, 41a, 41b, and 41c, (Fig. 5), for displaying digits and fractions conjointly representing, by their juxtaposition, the price at which a particular sale was made; and apertures 42, 42a, and 42b for displaying digits representing the volume of such sale. A rotatable shaft 43 bears in plates 44 and 45 mounted upon which shaft are oppositely-disposed ratchets 46 and 47. Fixed upon the upper end of shaft 43, so as to be rotated by said ratchets, is a gear wheel 48 directly underneath the plate 44, which gear wheel 48 meshes with a pinion 49 on a shaft 50, which shaft constitutes the axial bearing for a square pulley 51, and bears at its lower end in the plate 44 and at its upper end in the top plate 52 of the housing 40. Square pulley 51 coacts with square pulley 53, mounted on shaft 54, which shaft also has its bearings in plates 44 and 52, to drive a belt 55, carrying for display through one of the apertures, such as 41, the ten digits. In order to ensure that the belt is positively driven by the pulley 51, pins are placed in the faces of the pulley, which pins coact with eyelets mounted in reenforced edges of the belt. In the receiving apparatus shown, there are four such belts 55, each of which runs over a pair of square pulleys corresponding to the pulleys 51 and 53, each such belt having identical actuating mechanism with that which displays through aperture 41. The ten digits of the three belts on the left of Fig. 5 respectively conjointly register and display, by their juxtaposition, the integer of the price at which a sale has been effected; while the fourth belt, that is the one on the right in Fig. 5, carries fractions corresponding with those carried by wheel 5 of the registering-and-transmitting apparatus, such fractions being adapted to be displayed through aperture 41c.

The oppositely-disposed ratchets 46 and 47 are actuated by double pawls 56 and 57 respectively, carried on the free ends of pivoted armatures 59 and 58 respectively of electromagnets 60 and 61 respectively. These armatures 58 and 59 are biased by retractile spring 62, which couples the short extensions of the armatures beyond their pivots, their bias movement being limited by stops 63 and 64, as indicated in Fig. 7. The pawls 56 and 57 are pivoted on the free ends of armatures 59 and 58, and flat springs 65 and 66 bear against the outer face of these respective pawls and tend to rotate them in a position to hold the pawl in engagement with the ratchet teeth. As each armature is retracted by the spring 62, the corresponding pawl is withdrawn from engagement with its ratchet so as to leave the shaft 43 free at all times to be rotated in either direction when either armature is attracted. Guide pins 67 and 68 cooperate with the springs 65 and 66 to guide the respective pawls into engagement with the proper ratchet tooth, and also to assure the clearance of the ratchet by the pawls when they are retracted.

The movement of the armatures 58 and 59 to attracted positions also serves to operate two positioning members 69 and 70, pivoted on the upper side of plate 44 on pivot 71. These positioning members 69 and 70 coact with four pins 72 on the under side of square pulley 51, which pins enter into V-notches in the ends of the positioning members at the completion of a 90° movement of the square pulley, thereby assuring that the digit on the belt 55 will be properly related to the aperture 41. These positioning members are in the form of bell-crank levers, the short ends of which are coupled by tension spring 73 and are arranged to be actuated by a slide 74, guided for reciprocal transverse movement on the plate 44. Pins 75 and 76 on the respective armatures 58 and 59 extend up through slots in the plate 44 in position to engage the opposite ends of slide 74; and a projection 74a on the slide 74 extends between the ends of the short arms of the positioning levers 69 and 70. As the armature 58 is attracted, pin 75 will move the slide 74 to the left, as viewed in Fig. 6, which movement will throw the operative end of positioning member 70 inwardly so as to cause it to receive and properly locate the pin 72 at the conclusion of the 90° movement of the square pulley 51. The attraction of armature 59 will correspondingly cause the pin 76 to move the slide 74 in the opposite direction and thus throw the positioning member 69 into position to properly locate the square pulley 51.

Located in the bottom part of housing 40 is the receiving apparatus for registering and displaying the volume of a sale which has been made. This apparatus is generally similar to that of the price registering mechanism of this receiving and reproducing apparatus as above described. In this case there are three digit belts, 77, 77a and 77b, which are exposed through the respective openings 42, 42a and 42b, and each of which belts runs over a pair of square pulleys 78 and 79 (Fig. 8). Each of said belts carries the ten digits which, by their juxtaposition with the digits of the companion belts, conjointly register and display, through apertures 42, 42a and 42b, the volume of the sale. The indication of volume by the three belts is in terms of hundreds, thousands or tens of thousands—the two ciphers at the right of Fig. 5 being imprinted upon the housing 40.

The actuating mechanism for each of the volume registering belts is, in general, similar to that for the price registering belts above described, being, however, single-acting, instead of double-acting. In other words, a single electromagnet 80 operates armature 81 against retractile spring 82 to give the pawl 83 an impulse, and thus move a ratchet 84 step by step. This ratchet 84 is rotatably mounted on a stud 85 which extends between plates 86 and 87 and the ratchet is fixed to a gear wheel 88, also rotatable on the stud 85 and meshing with a pinion 89 on the shaft 90 of the square pulley 78. On the under side of gear wheel 88 is a spring housing 91 within which is coiled spring 92, attached at one end to the stud 85 and at the other end to the inner face of housing 91, whereby the spring is wound up by the rotation of gear wheel 88 under the impulse of the ratchet wheel. A pin 93 extends up from the plate 87 in the path of a lug 94 on the periphery of the housing 91, and serves as a stop to the movement of the housing in one direction under the influence of spring 92. The ratchet wheels 88, with their attached gear wheels and spring housings, are each held in the positions to which they are advanced step by step by their respective pawls, until they are released to be returned by the spring 92, by a spring detent 95, sliding in a tubular extension 95a on the face of a detent bar 96 (Figs. 8, 9 and 11) that extends across all three of the ratchets. This detent bar which carries the three detents for the respective ratchets is part of the armature of a controlling magnet 97, the pull of which magnet serves to draw the detent bar away from the ratchets and release them for resetting under the influence of their springs 92, while the bar 96, when unattracted, will occupy the detaining position shown in the drawings.

The square pulley 78 is accurately positioned at the end of each 90° movement in a manner similar to the corresponding pulley of the price registering mechanism. An upright pin 98 on which armature 81 coacts with slide 99 to move the positioning member 100 against the influence of the retractile spring 101, and the pins 102 on the square pulley 78 are received in the V-notch in the end of the positioning member as the end is swung inwardly by means of slide 99.

Figure 2:
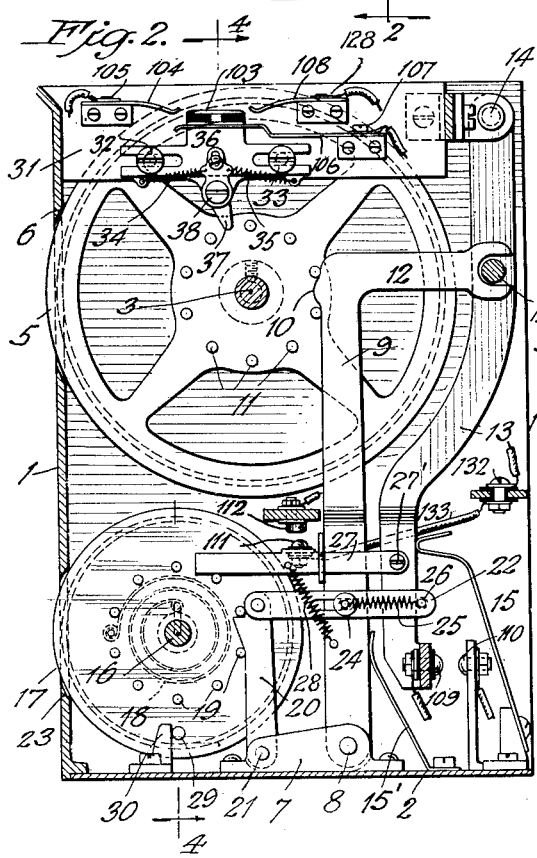
Fig. 2 is a vertical sectional detail of the same on the line 2—2 of Fig. 1.
Figure 3:
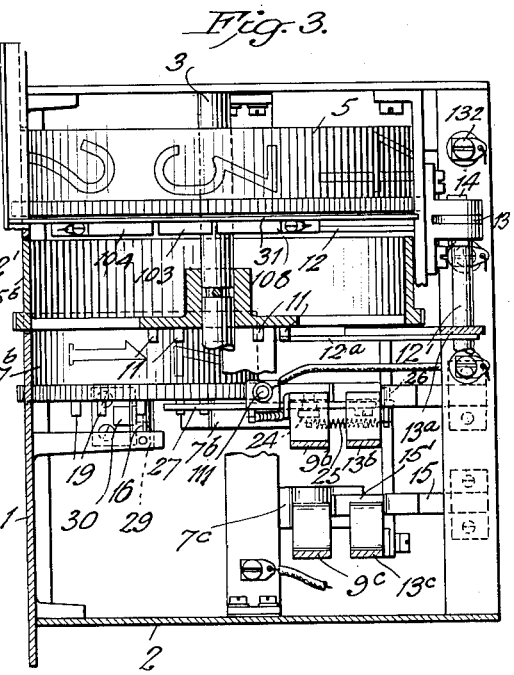
Fig. 3 is a transverse sectional detail of the same on the line 3—3 of Fig. 1.

Referring to Fig. 2, the mode of operation of the apparatus and system in the illustrated embodiment of the invention is as follows: manual rotation by one step in either direction of one of the price registering-and-transmitting wheels, such as 5, in the master apparatus, causes one or other of the pins, such as 11, to pass over the face of cam portion 10 of lever 9, moving said lever upon its fulcrum 8 so that it swings to the right, whereby connecting arm 12 produces a like movement of vertical switch-lever 13 upon its fulcrum 14. This movement of vertical switch-lever 13 carries horizontal switch-lever 27 to the right to a position wherein pins 19 will not, in the progress of the rotation of wheel 17, contact with the left-hand portion of said lever. Simultaneously link 22 has also been carried to the right, releasing the cam portion of locking-lever 20 from engagement with its coacting pins 19. When pin 11 has passed completely over the face of cam 10, the various springs restore the parts to their normal positions. If the price change is such as to involve a rotation of the price registering-and-transmitting wheel by more than one step, the movements of the various parts, as above described, will be repeated with each such step. With the first such movement of parts and the release of locking-lever 20, the energy theretofore stored in coiled spring 18 rotates volume registering-and-transmitting wheel 17 in a clockwise direction to a point where stop pin 29 contacts with stop 30, in which position the wheel 17 displays through its aperture a zero. Thus, whenever any change in price is registered, the display of digits conjointly indicating the volume of the preceding sale is automatically removed from the master registering-and-transmitting apparatus.

When price registering-and-transmitting wheel 5 is rotated in a counter-clockwise direction, one of the pins 11 will, by its contact with trigger 37, carry shuttle 36 to the left to a position where plate 103 forms an electrical connection with spring contact 104, thereby closing an electric circuit which includes binding-post 105, spring contact 104, plate 103, wiper 106 (electrically connected to plate 103), and binding-post 107. When price registering-and-transmitting wheel 5 is manually rotated in a clockwise direction, another of the pins 11 will, by its contact with the opposite side of trigger 37, carry shuttle 36 to the right to a position where plate 103 forms an electrical connection with spring contact 108, thereby closing another electric circuit. These circuits and the flow of current therethrough will be hereinafter described in detail. In the progress of the movement of shuttle 36 by one of the pins 11, one of the trigger springs 34–35 will have been extended; and, upon the passage of the pin out of contact with the end of the trigger, this spring tension will restore the shuttle to its normal central position as shown in Fig. 2, wherein it closes neither of the two electric circuits. I am enabled, by said spring action, to effect a very quick opening of the circuits, which is a desirable feature by reason of its minimizing the destructive action of arcing between the contacts.

The movement to the right of the lower end of vertical switch-lever 13, in the manner hereinbefore described (which movement follows rotation of price registering-and-transmitting wheel 5 in either direction), closes another electric circuit through contacts 109 and 110. This circuit and the flow of current therethrough will later be fully described.

Manual rotation in a counter-clockwise direction of volume registering-and-transmitting wheel 17 in the master apparatus causes one of the pins 19 to raise the left-hand end of horizontal switch-lever 27, whereby a third electric circuit is closed between contacts 111 and 112, which circuit, together with the flow of current therethrough, will also be hereinafter described in detail. In the progress of the counter-clockwise rotation of this volume registering-and-transmitting wheel 17, the pin such as 19, which has raised the left-hand end of horizontal switch-lever 27 to a position where the last mentioned electric circuit is closed, passes out of contact with the lower edge of said lever, permitting spring 28 to restore said lever to the horizontal position indicated in Fig. 2, thereby opening such electric circuit—the next lower pin serving as a stop for the downward movement of the lever. With each successive step in the progress of the manual rotation of the volume registering-and-transmitting wheel 17, such cycle of movements of parts is repeated.

Referring to Fig. 11: upon manual rotation in a counter-clockwise direction of price registering-and-transmitting wheel 5 of Fig. 2, and the consequent movement to the left of shuttle 36, current from one terminal of source 113 of electrical energy flows through lines 114, 115, 116, 117, 118, 119, magnet winding 61, lines 120 and 121, spring contact 104, plate 103, wiper 106, binding-post 107, line 123 and line 124 to the opposite terminal of source 113. The consequent energization of magnet winding 61 causes it to attract its armature 59 (Fig. 6) against the tension of spring 62, attached to which armature is pawl 56. Whenever magnet winding 61 is not energized, spring 68 retracts the armature 59 against stop 63. When the pull on the armature 59 overcomes the tension of spring 62, pawl 56 will, in the course of its movement (Fig. 7) pass into engagement with one of the teeth of ratchet 46. Further movement of the pawl turns the ratchet one step—gear wheel 48 being rotated a corresponding degree. Pinion 49 is thus caused to rotate pulley 51 and belt 55 a distance which brings a new digit into display through aperture 41. When, in the progress of the movement of price registering-and-transmitting wheel 5, shuttle 36 is carried to a position in which the electric circuit is opened, magnet winding 61 becomes de-energized and spring 62 retracts pawl 59 to a position shown in Fig. 7. With the next succeeding step in the rotation of price registering-and-transmitting wheel 5, the cycle of movements of the various parts, as above described, will be repeated.

Upon manual rotation in a clockwise direction of price registering-and-transmitting wheel 5 (Fig. 2), and the consequent movement to the right of shuttle 36, current flows from one terminal of source 113, through lines 114, 115, 116, 117, 118, 125, magnet winding 60, line 126, line 127, binding-post 128, spring contact 108, plate 103, wiper 106, binding-post 107, lines 123 and 124 to the opposite terminal of source 113. The consequent energization of magnet winding 60 (Fig. 6) causes it to attract, against the tension of spring 62, its armature 58 and, through its associated pawl 57 to turn ratchet 47 in a similar manner to that described in the last paragraph as relating to the companion actuating devices, but in the opposite direction. The digit displayed through aperture 41 (Fig. 5) of the receiving and reproducing apparatus will thus be higher or lower than the last displayed digit, depending upon whether price registering-and-transmitting wheel 5 is turned in a clockwise or in a counterclockwise direction.

The manual rotation in a counter-clockwise direction of volume registering-and-transmitting wheel 17 of the master apparatus closes an electric circuit between contacts 111 and 112 (Fig. 11), whereupon current flows from one terminal of source 113, through lines 114, 129, magnet winding 80, lines 130 and 131, binding-post 132, line 133, contact 111, contact 112, bus-bar 134, and lines 135 and 124 to the opposite terminal of source 113. Referring to Fig. 6: the energization of magnet winding 80 causes it to attract its armature 81, attached to which is pawl 83, constructed and arranged to rotate ratchet 84 a distance of one step upon the movement of armature 81 following the energization of magnet winding 80. Upon the de-energization of magnet winding 80, spring 82 returns armature 81 to its normal position as shown in Fig. 8, which removes said pawl from contact with ratchet 84.

Detent bar 96 carries three detents 95, which normally engage ratchets 84 to maintain them and their attached gear wheels 88 in position. This detent bar is attached by magnet 97, the pull of which magnet is opposed by springs 136 and 137 (Fig. 11), normally maintaining all three detents in engagement with their coacting ratchets. When, in the progress of rotation of price registering-and-transmitting wheel 5 involved in effecting a change in the digits displayed, vertical switch-lever 13 (Fig. 2) is moved to the right, bringing contacts 109 and 110 together, current flows from one terminal of source 113 through lines 114, 138, magnet winding 97, lines 139, 140, 141, binding-post 142, line 143, contact 109, contact 110, line 144 and line 124 to the opposite terminal of source 113. The consequent energization of magnet winding 97 causes it to attract its armature, carrying detent bar 96, thereby disengaging the three detents 95 from their coacting ratchets, permitting a coiled spring such as 92 (Fig. 9) to restore each of the volume-registering wheels of the receiving and reproducing apparatus to its zero position—thereby removing the display of digits indicating the volume of the last transaction. It is to be understood that in the progress of the manual rotation in a counter-clockwise direction of any of the volume registering-and-transmitting wheels of the master apparatus to display and transmit information as to the volume of another sale, the electric circuit associated with and controlled by said volume registering-and-transmitting wheel will be closed and opened with each step in such rotation, thereby alternately energizing and deenergizing its magnet winding 80, causing movement of its coacting pawl and ratchet, and rotation of its associated reproducing volume-registering pulley 78, actuating digit-bearing belt 145. The ratio of the gears which drive each of the square pulleys by the step-by-step actuation of the ratchet wheel, and also the range of movement of the armature and pawl on each impulse stroke, are such as to cause the square pulley to be turned 90° with each such impulse—thereby displaying a new digit with each step.

One of the principal advantages of exposing the digits on a flat face rather than on a curved face is the fact that thereby the pulley over which the belt runs may be minimized in size and space be thereby economized. In one case, for example, I display figures in the receiving apparatus which are substantially seven inches high and two and one-half inches wide; and it is apparent that if these figures were carried on curved surfaces the diameter of the wheel would have to be too large for practical purposes where such devices are to be used.

While I have described in detail the mode of operation of but one set of the elements embodied in my invention for the master registration and display, and the transmission, reproduction and display in repeating apparatus, of a digit comprising a part of a sale price, and of a digit comprising a part of a volume integer, it will be understood that this description is merely illustrative of the mode of operation of other such sets of elements, any desired number of which may be employed.

I do not intend to be understood as limiting myself to the employment of apparatus for registering, displaying, transmitting and reproducing numerals only, as it will be apparent that my apparatus and system is also operative to similarly register, display, transmit and reproduce information resulting from the manual juxtaposition, in the master device, of other characters, such, for example, as letters of the alphabet.

It will be obvious that various other changes in the details which have been herein described and illustrated for the purpose of explaining the nature of the invention may be made by those skilled in the art, within the principle and scope of the invention as expressed in the appended claims.

I claim:—

1. In combination, a master device embodying a set of independently rotatable elements conjointly registering one class of information, a second set of independently rotatable elements conjointly registering another class of information, means synchronizing in movement with said elements for respectively reproducing both sets of information at a distance from the master device and means actuated by movement of an element in the first master set of elements for removing the reproduced registration of the second class of information.

2. In combination, a master device embodying two sets of independently rotatable elements, the elements of each set being constructed and arranged to conjointly display by the juxtaposition of characters information of one class, means synchronizing in movement with said elements to respectively transmit and display both classes of information at a distance from the master device, and means whereby movement in one set of elements removes the display of information transmitted by the other set of elements.

3. In combination, a master display device comprising a set of movable elements, each of the elements of the set being independently movable with respect to the other elements of the set and the several elements being adapted to register one class of information, another set of movable elements, each element of the set having several characters thereon and being independently movable with respect to the other elements of the set to display successively the characters thereon and the several elements being adapted to conjointly display a class of information different than the class of information displayed by said first mentioned set of elements, means acting on the elements of said second mentioned set of elements and adapted to return the elements to their initial position, and means actuable by the elements of said first mentioned set for controlling the operation of the element returning means, a display device remote from the master device and comprising two sets of movable elements corresponding to the movable elements of the master display device, means acting on the elements of the remote display device corresponding to the elements of the second mentioned set of elements of the master display device and adapted to return the elements to their initial position, means resisting the action of said element returning means, and releasing means for releasing the resisting means, and means for actuating the elements of the remote display device in synchronism with the corresponding elements of the master display device to display on the remote display device the same information displayed on the master display device, and means actuatable by the elements of the first mentioned set of elements of the master display device for controlling the releasing means of the remote display device.

HARRISON S. MARTIN.